Feb. 4, 1941.  A. NOBLE  2,230,544
MEASURING INSTRUMENT
Filed March 4, 1938  4 Sheets-Sheet 1

Fig.1.

INVENTOR.
ALPHONSO NOBLE
BY
ATTORNEY.

Feb. 4, 1941.     A. NOBLE     2,230,544
MEASURING INSTRUMENT
Filed March 4, 1938     4 Sheets-Sheet 2

INVENTOR.
ALPHONSO NOBLE
BY
ATTORNEY.

Feb. 4, 1941.　　　　　A. NOBLE　　　　　2,230,544
MEASURING INSTRUMENT
Filed March 4, 1938　　　　　4 Sheets-Sheet 3

INVENTOR.
ALPHONSO NOBLE
BY
ATTORNEY.

Feb. 4, 1941.  A. NOBLE  2,230,544
MEASURING INSTRUMENT
Filed March 4, 1938  4 Sheets-Sheet 4

Fig. 8.

INVENTOR.
ALPHONSO NOBLE
BY
ATTORNEY.

Patented Feb. 4, 1941

2,230,544

UNITED STATES PATENT OFFICE 2,230,544

MEASURING INSTRUMENT

Alphonso Noble, Naugatuck, Conn., assignor to The Bristol Company, Waterbury, Conn., a corporation of Connecticut Application March 4, 1938, Serial No. 193,859

15 Claims. (Cl. 73—151)

This invention relates to measuring instruments, and more especially to an instrument of the type in which a deflectable pointer indicates by its relation to a graduated scale the magnitude of a variable condition which it is desired to measure. In instruments of this class intended for special applications, it is frequently required that measurements in some portions of the working range be made with a materially higher degree of precision than in others; and yet at the same time it is desirable that the scale provide for measurement with ordinary accuracy of values remote from the portion of the scale wherein the highest precision is required. In such cases, if use is made of a simple instrument in which a pointer deflects directly with the deflection of a sensitive element, a range providing definite indications of values at all points of the scale may make impracticable the high degree of precision required within a limited portion of the range.

It is an object of this invention to provide an instrument in which, while readings may be obtained with a sufficient degree of precision at all portions of the working range to be useful, a certain predetermined portion of the scale may possess a more open proportionality, expanding the graduations in a critical zone to an extent that accurate measurements may be made with a high degree of precision.

It is a further object of the invention to provide, for instruments operating under an inherently nonlinear law of response, a compensation whereby the useful range of the scale may be materially extended.

In carrying out the invention, there is provided between the sensitive and the indicating elements of an instrument two or more linkages or operating trains having different degrees of over-all sensitivity of response; and means for selectively inhibiting the function of these trains to produce the effect of different sensitivities of measurement in different portions of the range of operation. Provision is also made for further increasing the useful length of the scale by entirely eliminating a portion of the scale in which readings would be of little or no significance in the process to which the instrument is applied.

The nature of the invention, however, will best be understood when described in connection with the accompanying drawings, in which.

Figure 1:
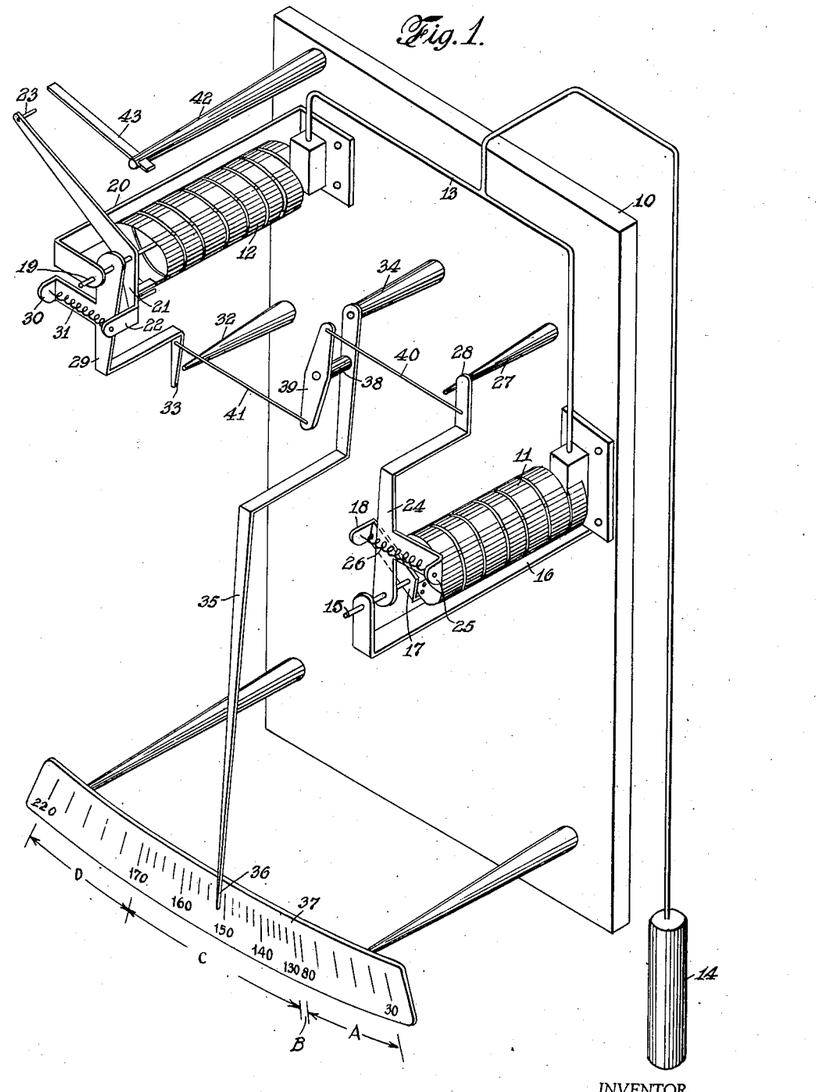
Fig. 1 is a perspective view of a thermometer embodying the principles of the invention and suitable, for example, as a dairy thermometer.

Referring to Fig. 1 of the drawings, 10 designates a base-plate to which are attached the several elements of the instrument. Mounted on the plate 10 are two helical Bourdon springs 11 and 12 coiled in opposite directions, both being internally connected by a capillary tube system 13 to a bulb 14 containing an expansible or volatile fluid, such, for example, as xylene. Upon change of the temperature to which said bulb is exposed, the internal pressure will be communicated to both Bourdon springs, producing therein angular deflections about their respective axes representative in magnitude of the change in pressure in the bulb 14 and in the tube system 13. As shown in the drawings, the Bourdon spring 11 tends to deflect in a counter-clockwise sense upon increase of internal pressure, whereas under the same condition the spring 12 tends to deflect in a clockwise sense.

Axially of, and concentric with, the Bourdon spring 11 extends a spindle 15 rotatively supported by a bracket 16 carried on the base-plate 10, and carrying an arm 17 to which is attached the movable end of the Bourdon spring 11, said arm also having a projection 18 extending parallel to the axis of spring 11 and being rotatable with the arm 17 through a limited angle about the spindle 15. Coaxially of the Bourdon spring 12 extends a spindle 19 rotatively supported by a bracket 20 carried on the base-plate 10, and having affixed thereto an arm 21 to which is attached the movable end of the Bourdon spring 12 and having two projections 22 and 23 each extending parallel to the axis of said spring 12 and both rotatable with the arm 21 through a limited angle about the spindle 19.

Carried by the spindle 15 and free for rotation thereon is an arm 24 having an L-shaped projection 25 and between the same and projection 18 is extended a tension spring 26, whereby the arm 24 and the projection 18 are normally maintained in engagement, with a consequent tendency for arms 24 and 17 to rotate together as a unit. A stop 27 mounted on the base-plate 10 projects into the path of an extended portion 28 of the arm 24, whereby rotation of the latter in a counter-clockwise sense is definitely limited.

Carried by the spindle 19 and free for rotation thereon is an arm 29 having an L-shaped projection 30; and between said projections is extended a tension spring 31, whereby the arm 29 and the projection 22 are normally maintained in engagement, with a consequent tendency for arms 29 and 21 to rotate as a unit. A stop 32 mounted on the base-plate 10 projects into the path of an extended portion 33 of the arm 29, whereby rotation of the latter in a counter-clockwise sense is definitely limited.

Pivotally mounted upon a post 34 carried by the base-plate 10 intermediate the Bourdon springs and their immediately associated mechanisms is an indicator arm 35, terminating in a pointer 36 traversing a graduated scale 37, whereby there is provided a measure of the excursion of the arm 35 along the scale. Carried by the arm 35 at a point displaced from its axis of rotation is a pivot mounting 38 upon which is pivoted at a point intermediate its extremities an extended floating lever 39.

Pivotally attached to the floating lever 39 at a point adjacent its upper extremity as shown in the drawings, and so located that as the lever 39 is rotated about its axis of rotation said point may pass substantially through the axis of rotation of the arm 35, is an extended link 40, also pivotally attached to the extended portion 28 of the arm 24, whereby is provided operative attachment between said arm and the floating lever 39. Pivotally attached to the lever 39 at a point adjacent its other extremity is an extended link 41 also pivotally attached to the extended portion 33 of the arm 29, whereby is provided operative attachment between said arm and the floating lever 39.

Carried by a post 42 mounted on the base-plate 10 is a cantilever spring 43 extended in a plane perpendicular to the axis of the spindle 19, and positioned to be engaged and deflected by the projection 23 on the arm 21 as the latter approaches the limit of its motion in a clockwise sense, thereby opposing such motion and adding its effect to the restraint offered by the natural elasticity of the Bourdon spring 12. The consequent angular deflection of the arm 21 for a given change of internal pressure in the Bourdon spring will thus be less with the spring 43 engaged by the projection 23 than when said parts are not in engagement.

The operation of the instrument will be understood by an analysis of its performance in the measurement of temperatures over such a range as would be encountered, for example, in the processing of milk. A scale suited to this purpose is shown on the instrument illustrated in Figs. 1 to 5, inclusive, this scale having four distinct zones or working ranges, which may be defined as follows: A cooling zone A extending from 30° F. to 80° F., and serving to exhibit to a suitable degree of precision temperature values attained by milk being cooled after pasteurization; a "dead" zone B, extending from 80° F. to 130° F., within which zone temperature values in the processing of milk are of secondary importance, and wherein the deflections of the pointer are made inappreciable, so that the markings representing the two last-named temperature values lie immediately adjacent each other on the graduated scale; a pasteurizing zone C, in which it is required that temperatures be determined with a relatively high degree of precision, necessitating that the scale be "open," or that the graduations representing increments of temperature be spaced well apart, which portion of the scale should include temperature values from 130° F. to 170° F., and may occupy more than half the total available scale length; and a sterilizing zone D, extending from 170° F. to 220° F., and having a spacing substantially that of the cooling zone.

Figure 2:
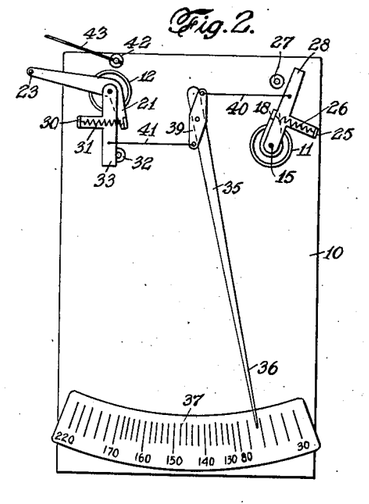
Figs. 2, 3, 4, and 5 show diagrammatically the relative positions of parts of the above instrument, corresponding to different positions of the pointer in its excursion over the graduated scale.

The manner in which the discontinuous proportionality of the scale is obtained may be described as follows: Assuming first the temperature under measurement to lie within the cooling zone A, the working parts of the instrument will occupy relative positions as indicated in Fig. 2. The pressure developed in the bulb 14 and transmitted through the tube system 13 to the Bourdon springs 11 and 12 being relatively low, the projection 18 carried by the arm 17 attached to the spring 11 will be in engagement with the arm 24. This will cause the said arm 24 to be forced in a clockwise sense away from the stop 27, thus serving through the link 40 to position the upper end (as shown in the drawings) of the floating lever 39 toward the right of its normal position substantially on the axis of rotation of the indicator arm 35. At the same time the Bourdon spring 12 will be deflected in a counter-clockwise sense, so that as the extension 33 of the arm 29 is definitely positioned by engagement with the stop 32, the projection 22 on the arm 21 will then be drawn away from engagement with the arm 29, the spring 31 yielding and permitting substantially free deflection of the Bourdon spring 12 without straining, such as would attend a definite stoppage of deflection of the Bourdon spring itself.

With the arm 29 thus definitely positioned, the link 41 prevents motion of the lower end of the floating lever 39, which consequently will pivot about the point of attachment of said link as a fulcrum, so that the pivot mounting 38 will be displaced laterally in the same sense as, but to a lesser degree than, the link 40. The indicator arm 35 is caused thereby to position its extremity, the indicating pointer 36, at a point within the zone A on the scale corresponding to the temperature to which the bulb 14 is exposed. So long as the variations in temperature are such that the extension 28 does not engage the stop 27 and the projection 22 does not engage the arm 29, the deflections of the pointer 36 in relation to the scale will be substantially proportional to changes of pressure within the Bourdon spring 11, whereby is obtained the portion A of the scale.

Figure 3:
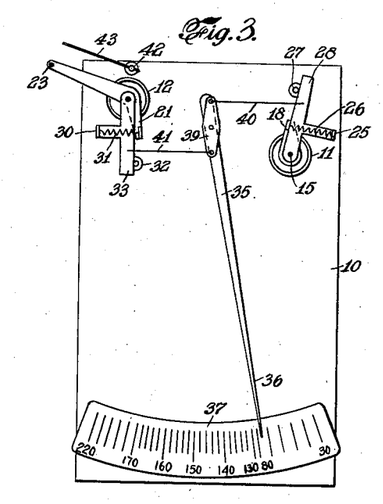

It may now be assumed that the temperature to which the bulb 14 is exposed has risen to a value corresponding to the desired upper limit of the portion A of the scale range (e. g., 80° F.). By means of adjustment (not shown in the drawings) the stop 27 has been so positioned that it will be caused to engage the extension 28 of the arm 24 as the temperature rises slightly above this point, and further motion of said arm in a counter-clockwise sense is inhibited; but the arm 17 is left free to deflect further in a counter-clockwise sense against the tension of spring 26, should the temperature rise still further. The length of the link 40 having been suitably selected, the upper extremity of the floating lever 39 will now lie substantially upon the axis of rotation of the arm 35, which arm will have been deflected toward the left from its former position in accordance with lateral motion of the upper end of the floating lever 39. Conditions will now be as indicated in Fig. 3, and the indicating pointer 36 will lie slightly above the graduation representing the upper limit of zone A, and therefore within the "dead" zone B.

Upon further increase of temperature both Bourdon springs will deflect angularly in their respective senses; but with both arms 24 and 29 being definitely positioned by the respective stops 27 and 32 and neither of the projections 18 and 22 in engagement with their respectively associated arms 24 and 29, no further motion will be communicated to the differential lever 39, and the pointer will remain inert within the zone B of the scale.

It may now be assumed that the temperature has risen to a value approaching the desired lower limit of the portion C of the scale, (e. g., 130° F.). By means of adjustment (not shown in the drawings) the projection 22 of the arm 21 has been so positioned that it will be caused, as the latter deflects in a clockwise sense with rising pressure in the Bourdon spring 12, and at a value slightly below said limit, to engage the arm 29, deflecting it in a clockwise sense, so that as said temperature value is attained the arm 29 will have assumed a definite position corresponding to said temperature.

Figure 4:
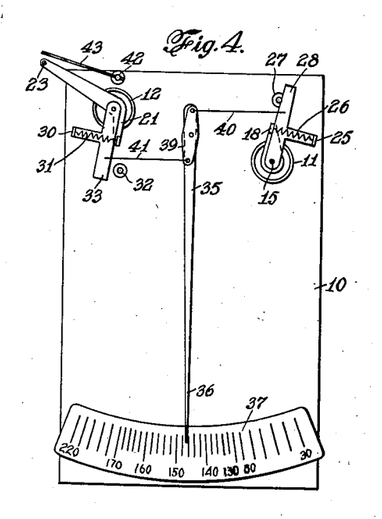
Figure 5:
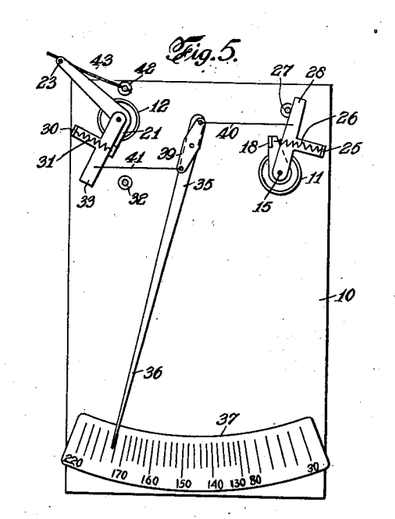

The upper end of the floating lever 39 being definitely positioned substantially on the axis of rotation of the arm 35, as hereinbefore set forth, and no further movement thereof being obtained in response to increased deflection of the Bourdon spring 11, it will be apparent that deflection of the arm 29 in response to increase of pressure within the Bourdon spring 12 will be communicated through the link 41 to the floating lever 39, and, as the latter pivots about a point substantially on the axis of rotation of the arm 35, said arm will partake of an angular motion substantially identical with that of the floating lever, the elements of the mechanism occupying relative positions substantially as shown in Figs. 1 and 4. The indicating pointer 36 will thus provide on the scale 37 and in the zone C thereof a measure of the temperature of the bulb 14 as determined by deflection of the Bourdon spring 12.

The relatively "open" scale required in this part of the range may be obtained by any one of a variety of expedients well known in the art. Either the Bourdon spring 12 may be given an inherently greater deflection per increment of internal pressure than that of spring 11, or the interconnecting linkages including the arms 24 and 29, or the respective arms of the floating lever 39, may be proportioned to give the desired relationship. If the thermometer system be of the vapor pressure class, the "increasing scale" characteristic of such systems may be utilized, and the relatively open scale in the zone C may be obtained without special mechanical design of the parts.

Figures 6, 7:
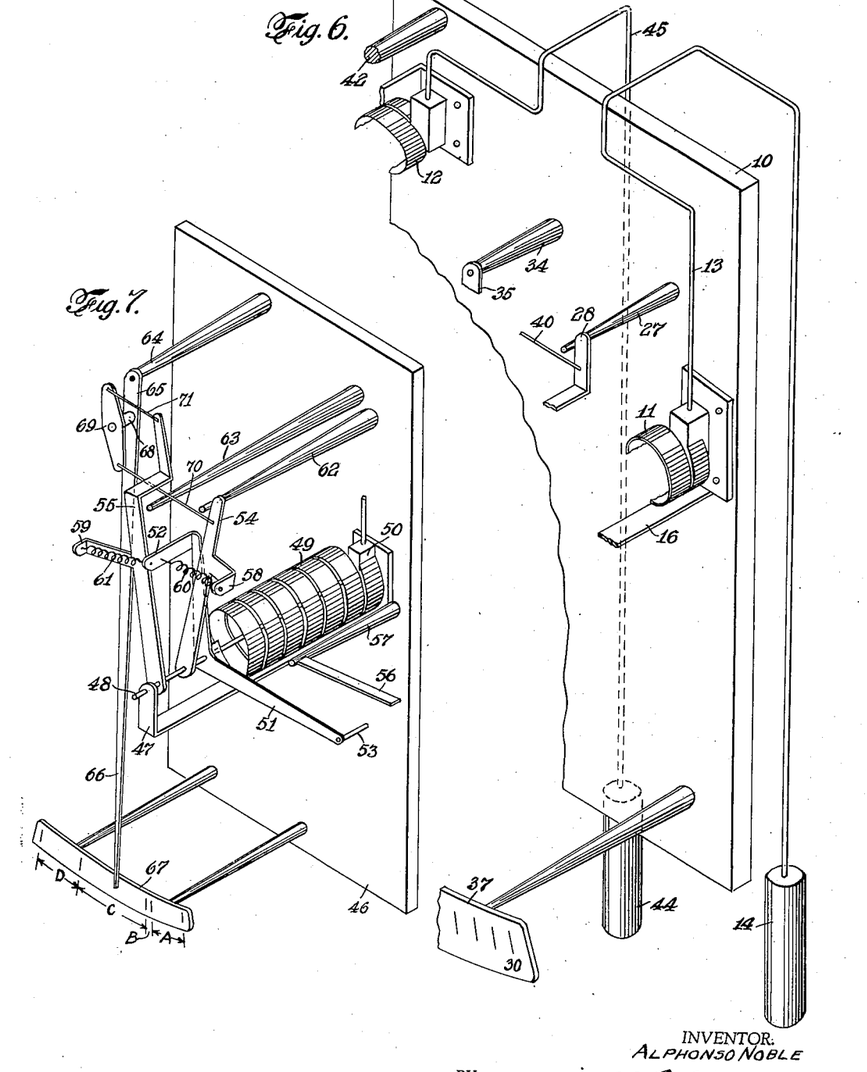
Figs. 6 and 7 are perspective views of alternative forms of instrument for producing a result similar to the above.

Flexibility of design may be further increased if necessary by the use of entirely separate thermometer systems, as by the provision of an additional bulb, as shown at 44 in Fig. 6. Such bulb is then connected by means of a capillary tube 45 to the portion of the system associated with the Bourdon spring 12 only, the communication between the two Bourdon springs 11 and 12 being severed. All these expedients are well known in the art and form no essential part of the present invention.

It may now be assumed that the temperature has risen to the upper limit of the portion of the range for which relatively high sensitivity is required, and that it is desired that the remainder of the useful scale include a relatively wide range of temperatures (e. g., 170° F. to 220° F.) within a comparatively short portion of the scale. As the arm 21 in its clockwise deflection with increasing pressures in the Bourdon spring 12 reaches a position corresponding to the upper limit of the zone C, the projecting pin 23 carried thereon will engage the cantilever spring 43 in a manner shown in Fig. 5, so that further deflection of the arm 21 will be opposed by said cantilever spring. The result is that given increments of pressure within the Bourdon spring 12 will produce relatively smaller movements of the parts subject thereto, so that the excursion of the pointer 36 in relation to the scale 37 for given temperature increments will be materially reduced from values obtained in the zone C, and the scale will be "closed" to the extent that a relatively great variation of temperature will be represented by a limited portion of the upper range, and the reduced sensitivity characterizing the zone D obtained.

In Fig. 7 is shown an alternative form of the invention, wherein there is accomplished with a mechanism having a single Bourdon spring a result substantially equivalent to that obtained with the form shown in Fig. 1 and having two Bourdon springs. Upon a base-plate 46 is mounted a bracket 47 pivotally supporting a spindle 48 coaxial with a Bourdon spring 49 having one end fixed to a suitable mounting 50 attached to the base-plate 46 and the other end adapted to rotate in a counter-clockwise sense upon increase of internal fluid pressure and attached to an arm 51 rotatable with that end of the spring about the spindle 48 as an axis.

The arm 51 carries two projections 52 and 53 parallel to the axis of the Bourdon spring, the former adapted to engage, according to the angular position of the arm 51, either of two arms 54 and 55, both of which are pivotally mounted upon the spindle 48. The projection 53 is adapted to engage a cantilever spring 56 carried by a post 57 mounted upon the base-plate 46, the purpose and performance of said spring in relation to movement of the arm 51 being identical with that of the spring 43 in relation to arm 21 as shown in Fig. 1 and explained in connection therewith. The arm 54 carries an L-shaped projection 58, and the arm 55 a similar L-shaped projection 59, said projections being disposed in opposite directions as related to the projection 52 on the arm 51. Between projections 58 and 52 is extended a tension spring 60; and between projections 59 and 52 a tension spring 61, said springs tending to bring both arms 54 and 55 into definite operative engagement with the projection 52 on arm 51, whereby, if unrestricted, all three of said arms might rotate as a unit with deflections of the Bourdon spring 49. Mounted upon the base 46 and located between arms 54 and 55 are stops 62 and 63 adapted to be engaged by said arms respectively, and so positioned as to prevent simultaneous engagement of said last-named arms with the projection 52, whereby is provided a zone of operation within which the arm 51 may deflect angularly without moving either of said arms, the springs 60 and 61 yielding to permit such free deflection.

Pivotally mounted upon a post 64 carried by the base-plate 46 is an indicator arm 65 terminating in a pointer 66 traversing a graduated scale 67 in all respects similar to the combination of pointer 36 and scale 37 shown in Fig. 1. Carried by the arm 65 at a point displaced from its axis of rotation is a pivot mounting 68 upon which is pivoted at a point intermediate its extremities a vertically extended floating lever 69. At a point on the lower extremity of said floating lever is pivotally attached a link 70 providing operative connection to a pivot point on the arm 54; and at a point on the upper extremity of said floating lever is pivotally attached a link 71 providing operative connection to a pivot point on the arm 55.

It will be apparent that upon changes in internal pressure in the Bourdon spring 49 the performance of the device as thus set forth will be substantially identical with that set forth in connection with the form shown in Fig. 1, and analyzed in Figs. 2, 3, 4, and 5. For example, with a low value of fluid pressure within the spring 49, the arm 51 will be deflected in a clockwise sense, the projection 52 carrying the arm 54 in the same direction, the arm 55 resting against the stop 63, and the spring 61 yielding to permit the clockwise deflection of the arm 51. Through the link 71 extended between the arm 55 and the upper extremity of the floating lever 69, said extremity is definitely positioned, so that the deflection of the lower extremity, as determined through the link 70 attached to the arm 54, serves to position the indicating pointer 66 in the lower portion of the scale 67, which condition, corresponding to zone A in Fig. 1, will be representative of the operation of the instrument so long as the arm 54 is restrained free of the stop 62.

Assuming, now, an increase of pressure within the Bourdon spring 49, the arm 51 will be deflected in a counter-clockwise sense; and upon engagement of the arm 54 with the stop 62 that arm will be prevented from further excursion, and the lower extremity of the floating lever 69 will be definitely positioned. Upon further counter-clockwise deflection of the arm 51, the projection 52 will be carried away from the arm 54, (the spring 60 yielding to permit such motion) and will approach the arm 55. During the transition of the projection 52, with rising pressure, from arm 54 to arm 55, both extremities of the floating lever 59 will remain fixed, and no deflection of the indicating pointer will take place, this condition corresponding to the "dead" zone B and the general condition shown in Fig. 3.

As the projection 52 reaches and engages the arm 55, the upper limit of the "dead" zone will be reached, and further deflection of the arm 51 in a counter-clockwise sense will cause the arm 55 to be carried in the same direction, acting through the link 71 to displace the upper extremity of the floating lever 69 toward the left. This will cause the indicating pointer 66 to be further deflected along the scale 67, thus establishing a condition corresponding to zone C and the general condition shown in Fig. 4. Further deflection of the arm 51 in response to increasing pressure within the Bourdon spring 49 will result in an increased excursion of the pointer along the scale with the desired sensitivity of measurement, as established by the relative proportioning of arm 54, floating lever 69 and other associated parts. This will continue until the projection 53 carried by the arm 51 engages the spring 56, thus meeting resistance to its natural deflection, and resulting in the remainder of the excursion of the pointer 66 along the scale 67 providing a "closed" scale, corresponding to the zone D fully set forth in the explanation associated with Fig. 5.

Figure 8:
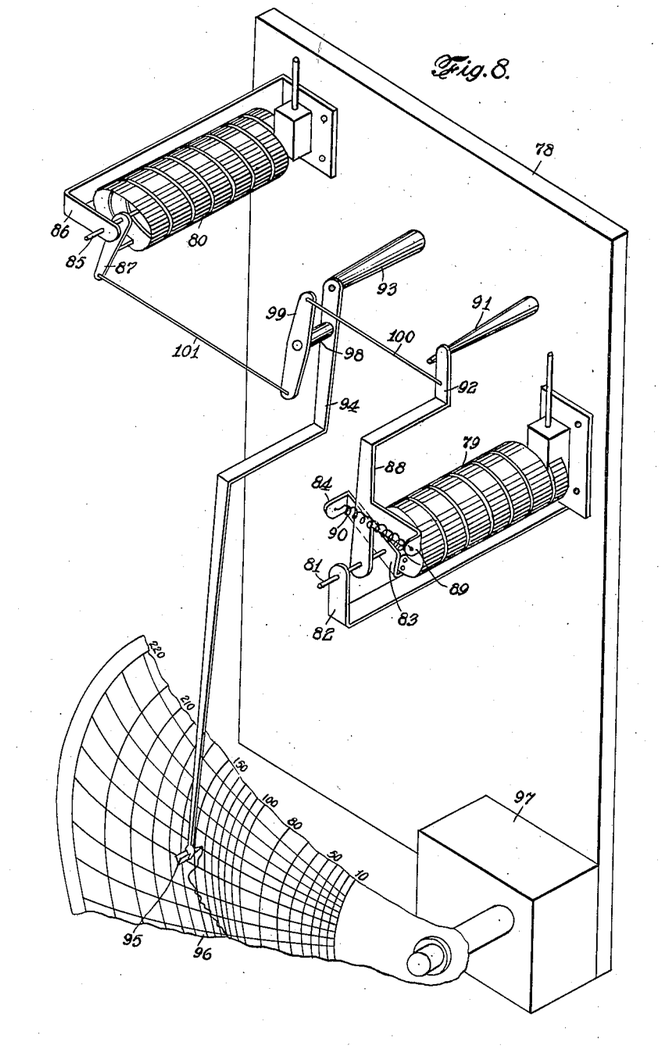
Fig. 8 is a perspective view of an instrument similar to that shown in Fig. 1, and adapted for compensation for a non-linear law of response.

In Fig. 8 is shown in the form of a graphic recorder a type of instrument embodying the invention, and especially adapted to use where it is desired to expand the lower, in relation to the upper, portion of the scale. This application finds use in instances where measurements in the lower parts of the scale are of relatively great importance, and also in instruments, such as vapor tension thermometers, and some forms of flow meters, where it becomes desirable to provide a compensation for "increasing" scale characteristics inherent to such measuring systems.

Mounted upon a base-plate 78 are two helical Bourdon springs 79 and 80, these being adapted for internal connection to common (or to separate, as the case may be) sources of fluid pressure which it is desired to measure. Coaxial with Bourdon spring 79 extends a spindle 81 rotatively supported by a bracket 82 carried on the base-plate 78 and having fixed thereto an arm 83 to which is attached the movable end of the Bourdon spring 79, and having a projection 84 parallel to the axis of said spring and rotatable with the arm 83 through a limited angle about the spindle 81. Coaxial with the Bourdon spring 80 extends a spindle 85, rotatively supported by a bracket 86 carried on the base-plate 78, and having affixed thereto an arm 87 to which is attached the movable end of Bourdon spring 80.

Carried by the spindle 81 and free for rotation thereon is an arm 88 having an L-shaped projection 89 and between the same and projection 84 is extended a tension spring 90, whereby the arm 88 and the projection 84 are normally maintained in engagement, with a consequent tendency for arms 83 and 88 to rotate together as a unit. A stop 91 mounted on the base-plate 78 projects into the path of an extended portion 92 of the arm 88, whereby rotation of the latter with arm 83 in response to increasing fluid pressure within the Bourdon spring 79 is definitely limited.

Pivotally mounted upon a post 93 carried by the base-plate 78 intermediate the Bourdon springs is an indicator arm 94 terminating in a pen or stylus 95, adapted to traverse the surface of a paper chart 96 having suitable graduations thereon and adapted to be driven by a timing element 97 attached to the base-plate 78, whereby there will be traced upon said chart a continuous record of all deflected positions assumed by the indicator arm 94. Carried by the arm 94 at a point displaced from its axis of rotation is a pivot mounting 98 upon which is pivoted at a point intermediate its extremities an extended floating lever 99. Pivotally attached to the lever 99 at a point adjacent its upper extremity as seen in the drawings is an extended link 100, also pivotally attached to the extended portion 92 of the arm 88, whereby is provided operative connection between said arm and the floating lever 99. Pivotally attached to the lever 99 at a point adjacent its other extremity is an extended link 101 also pivotally attached to the arm 87, whereby is provided operative connection between said arm and the floating lever 99.

In considering the operation of this form of the invention, it may be assumed that both Bourdon springs 79 and 80 are connected to a common source of internal fluid pressure, so that upon increase of said pressure both will tend to be deflected, the spring 79 in a counter-clockwise, and the spring 80 in a clockwise, sense.

The deflection of the arm 87 attached to the spring 80 being unrestricted throughout its working range, it will be apparent that this arm will at all times tend to deflect with changes of pressure within the spring 80, correspondingly positioning the lower extremity of the floating lever 99. The arm 88, on the other hand, having in association therewith the stop 91, is free for deflection only to a limited degree. Consequently, within the lower portion of the operating range of the instrument, changes in the internal fluid pressure common to both the Bourdon springs 79 and 80 will cause these springs to be deflected, and, acting through associated elements of mechanism, to react upon the respective extremities of the floating lever 99 both in a sense to deflect the arm 94 in the one direction. Thus, so long as the extended portion 92 of the arm 88 operates within a portion of its range where it does not engage the stop 91, the indicator arm 94 will be subject to the joint influence of both Bourdon springs, and will be deflected to a correspondingly great extent in response to changes of the measured magnitude.

As the fluid pressure within the Bourdon springs is increased, there will be attained a point where the extended portion 92 of the arm 88 will engage the stop 91, and will be definitely constrained from further deflection, the spring 90 yielding to permit substantially unrestrained deflection of the Bourdon spring 79. Upon further increase of pressure within the Bourdon springs, the upper extremity of the floating lever being now definitely positioned, movement will be transmitted to said lever only from the arm 80 through the arm 87 and the link 101, thus causing the arm 94 to be deflected to a materially lesser degree in response to a given increment of the measured magnitude. This transition from a condition where the indicator arm is subject to the joint influence of both measuring elements to a condition wherein it is subject to the influence of but one element is indicated on the scale of the instrument by an abrupt change in scale proportionality, as indicated at the value "100" on the graduated chart 96.

To those versed in the art it will be obvious that the principle of the invention is applicable to a great variety of proportionality modifications and of suppressions of unnecessary portions of instrument scales. While the principle has been disclosed in its application to a few special cases, it is not the intention that its scope be restricted to these particular forms, or to limit its use to instruments having not more than two primary measuring elements.

I claim:

1. In a measuring instrument: the combination of a deflecting pointer and a graduated scale associated therewith, a differential element carried by said pointer for rendering the same responsive to movement from two sources, means sensitive to changes in a condition to be measured, a plurality of mechanical trains connected thereto, at least one of which includes yielding means, for imparting to said pointer movements representative of said changes, and stationary means for inhibiting the function of said one of the trains when the magnitude of said condition lies within a predetermined zone of the range of measurement.

2. In a measuring instrument: the combination of a deflecting pointer and a graduated scale associated therewith, a differential element carried by said pointer for rendering the same responsive to movement from two sources, means sensitive to changes in a condition to be measured, a plurality of mechanical trains connected thereto, at least one of which includes yielding means, for imparting to said pointer movement representative of said changes, spindle means carrying said trains for independent rotation thereon, and stationary stop means for engaging a portion of said one of the trains for inhibiting the function thereof when the magnitude of said condition lies within a predetermined zone of the range of measurement.

3. In a measuring instrument: the combination of a deflecting pointer and a graduated scale associated therewith, a differential element carried by said pointer for rendering the same responsive to movement from two sources, means sensitive to changes in a condition to be measured, a plurality of mechanical trains connected thereto, at least one of which includes yielding means, for imparting to said pointer movement representative of said changes, spindle means carrying said trains for independent rotation thereon, stationary means for inhibiting the function of said one of the trains when the magnitude of said condition lies within a predetermined zone of the range of measurement, and means for inhibiting the function of another of said trains when the magnitude of said condition lies within a different predetermined zone of the range of measurement.

4. In a measuring instrument for determining the magnitude of a variable condition and including a graduated scale, a deflectable pointer adapted by its position relative to said scale to provide a measure of said magnitude, and means sensitive to changes in said condition: connecting means for providing operative relationship between said sensitive means and said deflectable pointer, said connecting means including a differential element carried by the pointer and two dissimilar linkages acting therethrough to deflect said pointer with different predetermined degrees of response relative to a given response of said sensitive member, together with stationary stop means and yielding means for rendering inoperative one of said linkages when said pointer is in one zone of its range.

5. In a measuring instrument for determining the magnitude of a variable condition and including a graduated scale, a deflectable pointer adapted by its position relative to said scale to provide a measure of said magnitude, and means sensitive to changes in said condition: connecting means for providing operative relationship between said sensitive means and said deflectable pointer, said connecting means including a differential element carried by the pointer and two dissimilar linkages acting therethrough to deflect said pointer with different predetermined degrees of response relative to a given response of said sensitive member, together with stationary stop means and yielding means for inhibiting the function of one of said linkages when said pointer is in one zone of its range, and means for rendering inoperative the other of said linkages when the pointer is in a different zone of its range.

6. In a measuring instrument for determining the magnitude of a variable condition and including a scale having zones graduated with different degrees of spacing for similar increments of the magnitude, a deflectable member adapted by its position relative to said scale to provide a measure of said magnitude, and a differential element carried by said deflectable member: two elements respectively sensitive in different degrees to changes in said condition and having independently operative yieldable connections to said differential element, said sensitive elements being adapted upon changes in said magnitude to affect the position of the deflectable member but with different degrees of response corresponding to said elements, a stationary stop positioned in the path of one of said connections to be engaged by the same and thereby to prevent the action of one of said elements upon said deflectable member while the same is in measuring relationship to one of said zones, and a stop positioned in the path of the other of said connections to be engaged by the same and thereby similarly to prevent the action of the other of said elements upon said deflectable member while the same is in measuring relationship with the other of said zones.

7. In a measuring instrument for determining the magnitude of a variable condition and including a scale having zones graduated with different degrees of spacing for similar increments of the magnitude, a deflectable member adapted by its position relative to said scale to provide a measure of said magnitude, and a differential element carried by said deflectable member: two elements respectively sensitive in different degrees to changes in said condition and having independently operative yieldable connections to said differential element, said sensitive elements being adapted upon changes in said magnitude to affect the position of the deflectable member but with different degrees of response corresponding to said elements, a stationary stop positioned in the path of one of said connections to be engaged by the same and thereby to prevent the action of one of said elements upon said deflectable member while the same is in measuring relationship to one of said zones, and a stop positioned in the path of the other of said connections to be engaged by the same and thereby similarly to prevent the action of the other of said elements upon said deflectable member while the same is in measuring relationship with the other of said zones, said stops being so relatively positioned as to both be in engagement with the respective connections, thereby causing said deflectable member to remain at rest, while the magnitude of said condition lies within a predetermined range of intermediate values represented by the graduated zones on said scale.

8. In a measuring instrument for determining the magnitude of a variable condition: the combination with a first element sensitive to changes in said condition, a lever associated therewith, yielding means connecting the same and normally retaining them in definite engagement; and a second sensitive element, a lever associated therewith, yielding means connecting the same and normally retaining them in definite engagement; of a stop for preventing the deflection of said first-named lever above a position corresponding to a predetermined value of said magnitude; a stop for preventing the deflection of said second-named lever below a position corresponding to a predetermined value of said magnitude, said values being of materially different magnitudes within the range of the instrument; and an indicator and a graduated scale juxtaposed thereto, together with differential means for rendering said indicator subject to the joint influence of said two first-named levers.

9. In a measuring instrument for determining the magnitude of a variable condition: the combination with a first element sensitive to changes in said condition, a lever associated therewith, yielding means connecting the same and normally retaining them in definite engagement; and a second sensitive element, a lever associated therewith, yielding means connecting the same and normally retaining them in definite engagement; of a stop for preventing the deflection of said first-named lever above a position corresponding to a predetermined value of said magnitude; a stop for preventing the deflection of said second-named lever below a position corresponding to a predetermined value of said magnitude, said values being of materially different magnitudes within the range of the instrument; and an indicator and a graduated scale juxtaposed thereto, together with a floating lever for rendering said indicator subject to the joint influence of said two first-named levers.

10. In a measuring instrument for determining the magnitude of a variable condition: the combination with two members sensitive to changes in said conditions, a pair of arms attached respectively to said members and a lever member for each arm to deflect therewith, a pair of yielding members for each of said arms and said levers to hold the same normally in engagement, a deflectable pointer adapted by its position relative to a graduated scale to provide a measure of said magnitude; and a differential linkage between said levers and said pointer whereby said pointer may partake of deflections proportional to those of said sensitive members, but with different degrees of response in respect to variations in the measured magnitude corresponding respectively to said sensitive members; of stops for preventing the deflections of said arms beyond positions corresponding to predetermined measured magnitudes, said yielding members permitting substantially unrestricted deflection of said sensitive members as the deflection of said arms is stopped.

11. In a measuring instrument for determining the magnitude of a variable condition and including two elements adapted to deflect in response to changes in said magnitude, each of said elements including a yielding member, and a single deflectable pointer adapted by its position relative to a graduated scale to provide an indication of said magnitude: an extended differential lever carried by said pointer and having its respective extremities linked each to a part of one of said elements, a stop for preventing deflection of the element part to which one of said extremities is linked above a position corresponding to a predetermined measured magnitude, and a stop for preventing deflection of the element part to which the other of said extremities is linked below a position corresponding to a predetermined measured magnitude.

12. In a measuring instrument for determining the magnitude of a variable condition: the combination with two members deflecting in response to changes in said magnitude, and stops adapted to limit the deflection of said members, together with an indicating pointer for said instrument; of differential means associated with said pointer for rendering the same responsive to the deflections of said members, said stops being so related to said members that in no portion of the range of measurement is said pointer responsive simultaneously to the deflection of both said members.

13. In a measuring instrument for determining the magnitude of a variable condition: the combination with two members deflecting in response to changes in said magnitude, and stops adapted to limit the deflection of said members, together with an indicating pointer for said instrument; of differential means associated with said pointer for rendering the same responsive to the deflections of said members, said stops being so related to said members that in no portion of the range of measurement is said pointer responsive simultaneously to the deflection of both said members, and a pair of members normally contacting respectively the deflecting members for imparting thereto motion representative of changes in the magnitude of said condition and each including a part yieldable upon engagement of a deflecting member with its stop to eliminate straining of the members consequent upon changes in said magnitude beyond a value corresponding to said engagement.

14. In a measuring instrument having an element sensitive to changes in a magnitude to be measured and an element responsive to said sensitive element to provide a measure of said magnitude in accordance with an inherently non-linear law of response; two mechanical trains including yielding members, a differential element carried by said responsive element and adapted to coordinate said trains, whereby both are operative normally to associate said sensitive and responsive elements, together with stationary stop means interposed in the path of one of said trains to obstruct the same, thereby rendering it inoperative in a selected zone of the range of measurement, the yielding member in said train permitting substantially unrestricted movement of said sensitive element.

15. In a measuring instrument having an element sensitive to changes in a magnitude to be measured and an element responsive to said sensitive element in accordance with an inherently non-linear law of response; two mechanical trains including yielding members, a differential element carried by said responsive element and adapted to coordinate said trains, whereby both are operative normally to associate said sensitive and responsive elements, together with stationary stop means interposed in the path of one of said trains to obstruct the same, thereby rendering it inoperative in a selected zone of the range of measurement, the yielding member in said train permitting substantially unrestricted movement of said sensitive element, and resilient means adapted to be engaged by a part of one of said trains when so engaged to modify the proportionality of a predetermined zone of said scale.

ALPHONSO NOBLE.